United States Patent [19]

DiSanto et al.

[11] Patent Number: 5,006,212
[45] Date of Patent: Apr. 9, 1991

[54] METHODS ENABLING STRESS CRACK FREE PATTERNING OF CHROME ON LAYERS OF ORGANIC POLYMERS

[75] Inventors: Frank J. DiSanto, North Hills; Denis A. Krusos, Lloyd Harbor; Frederic E. Schubert, Shoreham, all of N.Y.

[73] Assignee: Copytele, Inc., Huntington Station, N.Y.

[21] Appl. No.: 166,430

[22] Filed: Mar. 10, 1988

[51] Int. Cl.[5] .............................................. C23C 14/34
[52] U.S. Cl. ........................... 204/192.14; 204/192.15; 204/192.23; 156/664
[58] Field of Search ...................... 204/192.14, 192.15, 204/192.22, 192.23; 156/630, 634, 656, 664; 427/126.1, 126.3, 309, 327

[56] References Cited

U.S. PATENT DOCUMENTS

| | | | |
|---|---|---|---|
| 4,048,039 | 9/1977 | Daxinger | 204/192.14 X |
| 4,097,636 | 7/1978 | Hawryls et al. | 204/192.15 X |
| 4,364,792 | 12/1982 | Gliem et al. | 204/192.14 X |
| 4,383,003 | 5/1983 | Lifshin et al. | 204/192.15 X |
| 4,655,897 | 4/1987 | DiSanto et al. | 204/299 R |
| 4,705,592 | 11/1987 | Bahrle et al. | 204/192.14 X |
| 4,728,406 | 3/1988 | Banerjee et al. | 204/192.15 X |

Primary Examiner—Nam X. Nguyen
Attorney, Agent, or Firm—Arthur L. Plevy

[57] ABSTRACT

There is disclosed a method to enable one to deposit a thin layer of chrome to a thicker layer of an organic polymer. The surface of the organic polymer has a thin layer of silicon dioxide deposited thereon and then a thicker layer of chrome is sputtered onto said layer of silicon dioxide. This enables one to pattern and to wire bond to the chrome layer while avoiding stress cracks in the chrome as provided by prior art techniques.

8 Claims, 1 Drawing Sheet

METHODS ENABLING STRESS CRACK FREE PATTERNING OF CHROME ON LAYERS OF ORGANIC POLYMERS

BACKGROUND OF THE INVENTION

This invention relates to a method and technique of metallizing an organic layer and particularly to chrome metallization of such an organic layer.

Chrome or chromium has been widely employed in the prior art as an electroplate material as having an excellent corrosion resistance and a lustrous appearance. Chrome is relatively inexpensive and has a very hard abrasion resistive surface with a low coefficient of friction. Chrome is widely employed for many applications considering its durability and also considering the ability to utilize chrome for wire bonding to electrical circuitry.

The chrome metallization of an organic layer generally results in a multitude of cracks in the chrome due to stress and other factors. These stresses are due to the fact that the chrome has a different coefficient of expansion than the organic layer. A further problem is that due to the elasticity of the organic layer, wire bonding is difficult to implement. Such organic layers, for example, constitute organic polymers. These polymers provide electrical insulation and are widely employed in many areas. Thus, if one attempts to deposit chrome on such an organic layer, the above-noted problems exist. In addition circuit patterns cannot be reliably reproduced due to cracks in the chrome. There are two causes of stress in the chromium. One is intrinsic stress due to defects in crystal structure during deposition. The other is thermal stress. The latter is due to the fact that the coating is typically deposited or processed at a high temperature, 150° C. for example. As the coating and substrate heat or cool, they expand and contract at different rates. This causes stress. Organic polymers typically expand or contract ten or more times as fast as chrome. Silicon dioxide expands only about 1.5 times the rate of chrome. As will be explained, and according to this invention, the highest thermal stress interface has been moved away from the chrome to the silicon dioxide - polymer interface.

Thus, as one can ascertain from the above, while it is extremely desirable to utilize chrome as a conductor and as a reliable element it is extremely difficult, utilizing prior art techniques, to deposit the chrome on an organic polymer.

It is therefore an object of the present invention to describe a method of applying a submicron layer of silicon dioxide to the organic material, followed by a submicron layer of chrome which is deposited upon the layer of silicon dioxide. It is indicated that after patterning of the chrome on the silicon dioxide no stress cracks were evident. It was also discovered that wire bonding to the chrome layer, as deposited on a silicon dioxide layer, was easily accomplished.

BRIEF DESCRIPTION OF THE PREFERRED EMBODIMENT

A method for depositing a thin layer of chrome on a relatively thick layer of an organic polymer comprising the steps of forming a thin layer of silicon dioxide on said polymer layer and then forming a layer of chrome on said silicon dioxide layer with said layer of chrome being thicker then said layer of silicon dioxide to enable one to pattern and wire bond to said chrome layer.

DETAILED DESCRIPTION OF THE DRAWINGS

The present problem was discovered and solved during the fabrication of electrophoretic displays. The techniques to be described are applicable to any situation where thin layers of metal must be deposited, patterned and wire bonded on an organic underlayer.

Figure 1:
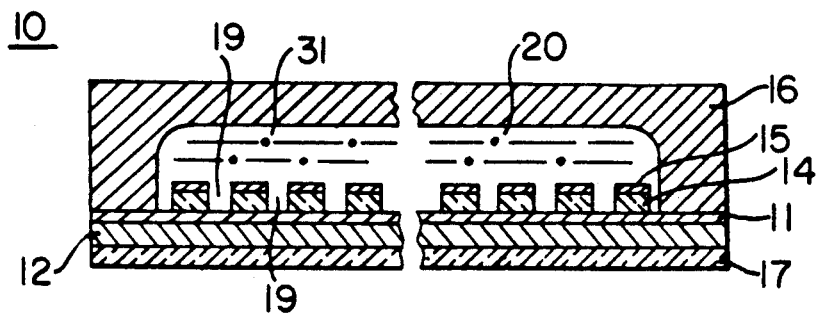
FIG. 1 is a cross sectional view of an electrophoretic display panel useful for employing this invention.

Referring to FIG. 1 there is shown a typical electrophoretic display 10. For examples of such displays, reference is made to U.S. Pat. No. 4,655,897 issued on Apr. 7, 1987 to F. J. DiSanto and D. A. Krusos entitled "Electrophoretic Display Panels and Associated Methods" and assigned to the assignee herein. Essentially electrophoretic displays typically involve an X-Y grid where the X and Y directions are separated by a suitable insulator. The X lines of the grid can be patterned on transparent conductively coated glass. Reliable methods of ultimately connecting the X lines of the array have been developed. The X lines are metallized with chrome which metallization presents no problems due to the fact that there is a glass underlay which is firm and non-compliant.

By the nature of the electrophoretic display, the Y lines are typically separated from the X lines by a plasma etchable organic dielectric layer of significant thickness, typically 4 to 12 or more microns. This layer, which serves as an insulator and spacer, also represents a thick elastic under layer for the Y display lines.

This invention, as will be further described, involves a method which permits reliable wire bonding of submicron thickness patterned metal on an 4 to 12 micron polymer underlayer.

Referring to FIG. 1 there is shown a cross-sectional view of a typical prior art electrophoretic display. A plate of glass 17 is coated with an extremely thin layer of indium-tin-oxide (ITO). The layer 12 of ITO is relatively thin, being approximately 300 angstroms in thickness. The layer of ITO, based on its thickness, is relatively transparent. While the present application will discuss the X conductor wires as the grid structure with the Y conductor wires being the cathode structure, it is immediately understood that this terminology can be reversed as the cathodes or grids can be interchanged.

The horizontal grid line pattern 11 is etched from the layer of ITO 12 and has deposited orthogonally to the plurality of horizontal grid lines 11 a plurality of vertical cathode lines 15. The vertical cathode lines are separated from the horizontal lines by means of an insulator 14. This insulator is typically an organic polymer between 4 to 12 microns thick. The insulator members 14 may be formed by a novolac resin or polyimide which layer is deposited over the entire cathode line structure. The methods of forming such a display are described in the above-noted patent.

As seen in FIG. 1, the cathode lines as 15 must be insulated from the grid lines as 11. The layer of insulator as indicated is an organic polymer which is between 4 to 12 microns thick. An anode structure 16 is shown and may be formed of ITO and forms a hollow 20 which accommodates an electrophoretic dispersion 31. Reference numeral 19 refers to walls which are described in the above cited patent.

Figure 2:
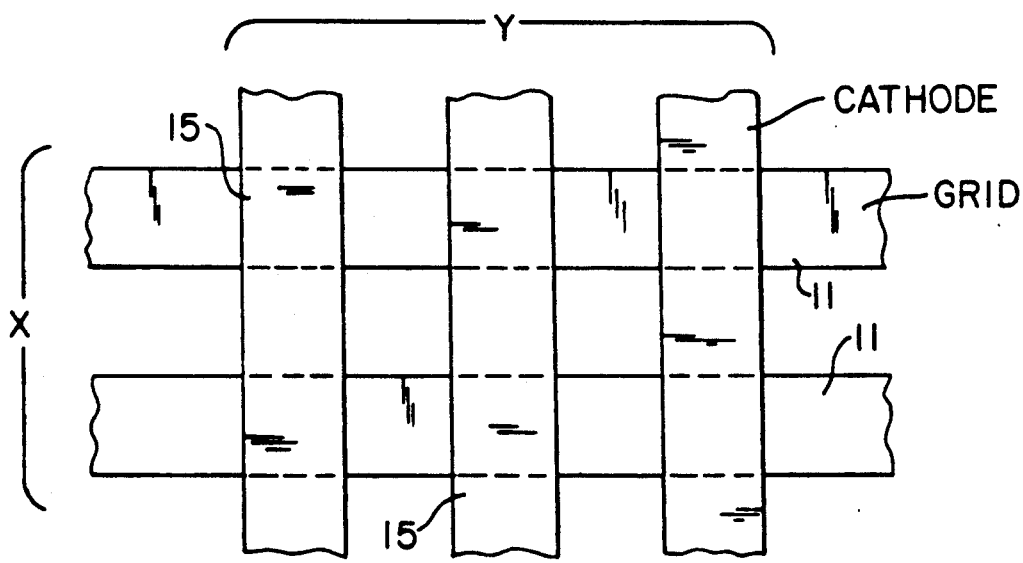
FIG. 2 is a top plan view of a grid and cathode line pattern employed in an electrophoretic display.

Shown in FIG. 2 is a top plan view of how the array is formed having grid and cathode lines which are insulated one from the other at the intersection areas. The purpose of the plasma etchable organic dielectric layer, which thickness is between 4 to 12 or more microns, is to serve as an insulator and spacer and represents a thick elastic underlayer for the Y or cathode lines.

In FIG. 1 it is seen that there is a metal layer 15 deposited directly on the insulator members 14. This is a prior art technique. In any event, it is extremely desirable to utilize chrome due to the many advantageous properties of chrome. The chrome is used to metallize both the X and Y lines. In regard to the grid lines 11, there is no problem in metallizing those lines with an extremely thin layer of chrome due to the fact that those lines are deposited directly on the glass substrate 17 which essentially is a rigid and non compliant member. In any event, when one attempts to deposit chrome on the organic polymer, extreme problems occur.

As indicated, a key fabrication step in forming the electrophoretic display assembly involves the deposition, patterning and bonding of a layer of metal, as chrome, on an 4 to 12 micron layer of organic polymer. Difficulties in carrying out this procedure center around the elasticity of the polymer. The elasticity of the polymer causes two key problems. The first problem is that stresses in the chrome tend to shear the polymer surface providing stress cracks in both the chrome and the polymer. The second problem involves wire bonding to the composite layer. This is extremely difficult because the polymer under layer compresses easily dampening the impact of the bonding head and hence no bond forms. In order to solve these problems, the following steps were implemented.

Figure 3:
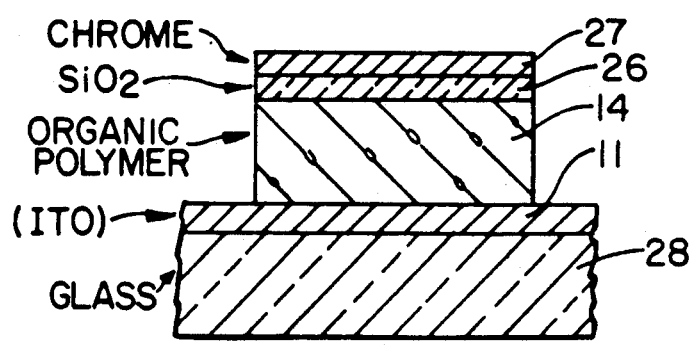
FIG. 3 is a cross sectional view used in describing the method of this invention.

Referring to FIG. 3 the procedure will be described. As seen in FIG. 3 there is shown a metallized grid line 11 having located on the grid line an insulator layer of polymer 14. The grid line 11 is positioned on the glass plate 28. In order to solve the above-noted problems a thin layer of silicon dioxide 26 was formed on the polymer surface and then a thin layer of chrome 27 formed on the surface of the silicon dioxide. By using this technique, in regard to the deposition of chrome on a silicon dioxide surface, no stress cracks are observed.

Wet etching with less than a micron of undercut is easily accomplished and the surface is sufficiently durable so that areas of pattern with 50 micron lines can be safely scrubbed. The scrubbing technique, employing an abrasive material such as titanium dioxide, is used as a final step after fabrication of a panel to create a uniformly clean surface to allow wire bonding to this surface without difficulty.

As one will understand from FIG. 3, the effective height of the insulating layer 14 is between 4 to 12 microns. The layer of silicon dioxide 26 is between 0.2–0.5 microns with the layer 27 of chrome being between 0.5–0.75 microns. The procedure, as indicated, involves deposition of preferably 0.2 microns of silicon dioxide which is positioned between the polymer 14 and metal layer 27. The technique involves deposition of a layer of silicon dioxide about 0.2 microns thick on the polymer surface prior to sputtering on the chrome layer 27. The silicon dioxide layer does not shear under stress from the chrome. This layer is hard enough that wire bonding to the chrome layer is extremely reliable.

In a typical display 1300 bonds have to be made with relatively few misses on each display module. The typical strength of each bond is around 5g and this is available utilizing the intermediate layer of silicon dioxide.

Furthermore, simple wet etching produces features with less than 1 micron undercut over an entire 5×8 inch piece with over 1,000 running feet of edges. This is an important factor since several attempts to coat chrome directly on polymer were initially stress-crack free. It was only during the photoresist development and chrome etching of the display patterns that stress cracks appeared. An additional advantage of this approach is that the chrome on silicon dioxide on polymer is extremely durable. In this way it can be hand scrubbed if necessary.

The steps in the procedure are as follows: The thick polymer insulator layer 14, which is a polymide or novolac resin, is deposited by spin coating utilizing a Headway spinner at an appropriate speed for the desired thickness. In some cases multiple coats of the polymer insulator are applied. The coatings are fully baked. One obtains such coatings from a company called Shipley of Marlboro, Mass. who supplies novolac resins. Polymides from DuPont and General Electric have also been employed.

After forming the thick polymer insulator layer, silicon dioxide is evaporated on the layer 14 to a thickness of about 0.2 microns using a vapor deposition or evaporating system. Techniques for depositing silicon dioxide are well known in the art.

After the formation of the layer of silicon dioxide, the chrome is sputtered on the layer of silicon dioxide 26 to a thickness preferably of about 0.75 microns using a commercially available sputtering system. The sputtering of chrome is also well known. Thus, as indicated, the present invention describes a method of applying a submicron layer of silicon dioxide to an organic material which has then applied to the layer of silicon dioxide a submicron layer of chrome. By utilizing this technique it was discovered that after patterning of the chrome no stress cracks were evident. It was also discovered that wire bonding to the chrome layer was easily accomplished even though the chrome layer was in fact formulated on a very compliant or elastic layer of an organic polymer.

We claim:

1. A method for depositing a thin layer of chrome on a relatively thick layer of an organic polymer which organic polymer layer is an insulator layer between a grid and a cathode line of an electrophoretic display to enable one to pattern said layer of chrome and to ball bond thereto, comprising the steps of forming a thin layer of silicon dioxide between 0.1 to 0.4 um on said polymer layer with said polymer layer between 4 − 15 um and then forming a layer of chrome between 0.5 to 0.75 um on said silicon dioxide layer with said layer of chrome being thicker than said layer of silicon dioxide to enable one to pattern and wire bond to said chrome layer.

2. The method according to claim 1 wherein said organic polymer is selected from a novolac resin or a polymide.

3. The method according to claim 1 wherein said layer of silicon dioxide is formed by an evaporation technique.

4. The method according to claim 1 wherein said layer of silicon dioxide is formed by a sputtering technique.

5. The method according to claim 1 wherein said layer of chrome is sputtered to a thickness of about 0.75 um on said layer of silicon dioxide.

6. The method according to claim 1 further including the step of scrubbing said chrome layer after forming and patterning the same on said layer of silicon dioxide.

7. The method according to claim 6 wherein the step of scrubbing includes scrubbing with titanium dioxide particles.

8. The method according to claim 1 wherein said layer of organic polymer is formed on a metal base layer indicative of a control line in an electrophoretic display with said organic polymer serving to insulate said control line from said chrome layer which chrome layer forms an intersecting control line for said display.

* * * * *